Aug. 21, 1928.
L. C. KING
SPECTACLES
Filed May 29, 1926
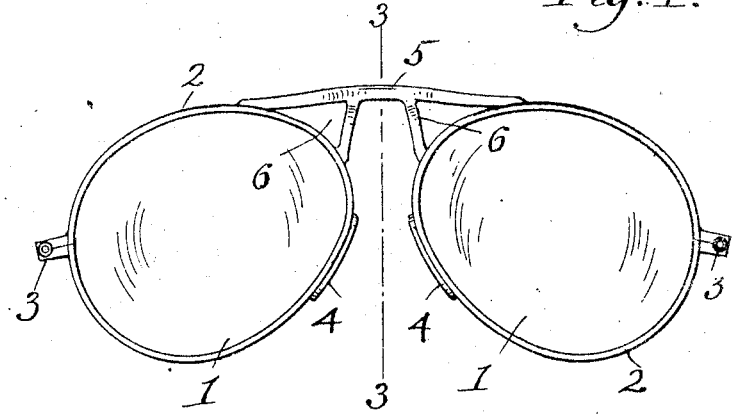
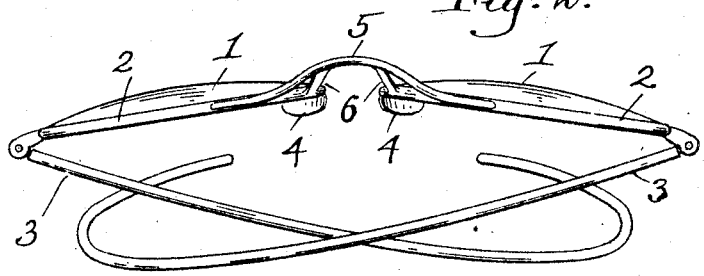
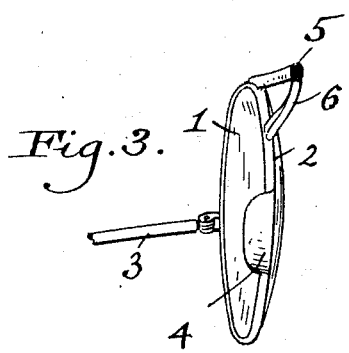
Inventor
Louise C. King
By Kwis Hudson & Kent
Attorneys Patented Aug. 21, 1928.

1,681,735

UNITED STATES PATENT OFFICE.

LOUISE C. KING, OF CLEVELAND, OHIO.

SPECTACLES.

Application filed May 29, 1926. Serial No. 112,503.

This invention relates to spectacles and has for its object to provide a mounting which permits the lenses to be easily and quickly adjusted with respect to each other to the most comfortable position for the persons wearing the same.

In view of the fact that there is great variation in the size and contour of the faces of individuals and in the size and contour of the portions of the nose upon which the spectacles are supported, it is often quite difficult for an individual to obtain spectacles which are so constructed as to be comfortable when worn and it is an object of the present invention to provide spectacles so constructed that they may be quickly and easily adjusted to conform to the contour of the face of any person and which can be easily adjusted when in use to position the lenses at the desired distance from the eyes and to support the same upon different portions of the nose.

More specifically the present invention has for its object to provide an adjustable bridge structure so constructed and connected to the lens rims that the lenses may be grasped in the hands and adjusted toward each other or into planes at various angles with respect to each other as may be desirable to properly position the nose pads and to position the lenses to conform to the contour of the face, the spectacle frame being bendable about various axes to position the lenses and the nose pads in the manner most comfortable for the wearer.

It is an important object of the invention to provide a bridge connecting the lenses which may not only be bent to permit the desired adjustment but which also has the necessary rigidity in all positions of adjustment to retain the lenses when in use in the positions to which they have been adjusted.

With the above and other objects in view the invention may be said to comprise the device as illustrated in the accompanying drawings hereinafter described and particularly set forth in the appended claims together with such variations and modifications thereof as will be apparent to one skilled in the art to which the invention appertains.

Reference should be had to the accompanying drawings forming a part of this specification in which Fig. 1 is a front elevation of the spectacles; Fig. 2 is a top plan view thereof, and Fig. 3 is a section taken on the line 3—3 of Fig. 1.

Referring to the accompanying drawings, the spectacles consist of the lenses 1 which may be clear or colored, the rims 2 in which the lenses are mounted, the temples 3 connected to the outer ends of the rims, the nose pads 4 attached to the rims adjacent the inner ends thereof and the bridge structure connecting the rims.

The present invention consists of an improvement in the bridge structure which facilitates the adjustment of the lenses. The bridge consists of a main cross bar 5 which is connected at its opposite ends to the tops of the two lens rims and bowed outwardly with respect to the planes of rims. The bridge is also provided with brace bars 6 which are connected at their upper ends to the outwardly bowed portion of the cross bar 5 and extend downwardly and inwardly to adjacent the inner ends of the rims above the nose pads where they are rigidly connected to the rims, the brace bars 6 having also a slight outward bow as shown in Fig. 3 of the drawing.

The cross bar 5 and brace bars 6 are formed of bendable metal which is of low resiliency and will remain in the shape to which it is bent. By reason of the outward bow of the cross bar 5 this cross bar can be readily bent to adjust the lenses about a vertical axis into planes at different angles one with respect to the other. This may be done by grasping the two lenses and turning them until they are positioned at the desired angle. The construction of the bridge also permits the lenses to be adjusted one with respect to the other about a horizontal axis at right angles to the face of the wearer by merely pushing one lens toward the other, this lateral adjustment enabling the nose pads to be adjusted toward or from each other as may be desired to provide a comfortable fit upon the nose. The bridge structure also permits the nose pads to be adjusted toward or from each other without varying the angle between the same by simply holding the lenses against turning movement and pushing one toward the other. The bridge structure may also be readily bent to adjust the portions of the lenses carrying the nose pads toward or from the face by twisting the lenses so as to move the lower ends of the brace bars inwardly or outwardly with respect to the bridge bar. Thus the lenses may be positioned at the desired angle one with respect to the other with respect to various axes or planes at the desired distance apart and at various inclinations with respect to a vertical plane. In the adjustment of the lenses toward each other the outwardly inclined braces 6 transmit an outward thrust against the bowed portion of the cross bar 5 increasing the bow thereof and also of the brace bars. The brace bars in addition provide the necessary strength in the bridge structure to hold the spectacle frame in the position to which it has been adjusted. The wearer can readily adjust the angular position of the lenses to the position most comfortable and may readily adjust the lenses to bring the nose pads to the positions in which the spectacles are most comfortably supported, it being necessary only to slightly adjust the lenses toward or from each other to position the nose pads for engagement at higher or lower points on the nose. In addition the present invention makes it convenient for the same pair of spactacles such as colored lens outing spectacles to be used by different persons, a slight adjustment being usually sufficient to comfortably adapt the spectacles to the face of the wearer.

Having thus described my invention, I claim:

1. Spectacles comprising a pair of lenses having rims, a bridge bar attached at its opposite ends to top portions of the rims, said bar being bowed outwardly with respect to the planes of the lens rims, and a pair of brace bars extending downwardly and inwardly from the bowed portion of the bridge bar, one to each of the lens rims, said bars being bowed outwardly between the lens rim and bridge bar, said bridge and brace bars being formed integrally and being bendable in a plurality of directions to permit universal adjustment of the lenses with respect to each other, the material of said bars being sufficiently stiff to hold the lenses in the positions to which they are adjusted.

2. Spectacles comprising a pair of spaced lenses, a bridge bar attached at its opposite ends to top portions of the lenses, said bar being bowed outwardly with respect to the planes of the lenses, and a pair of outwardly bowed brace bars connected at their upper ends to the outwardly bowed portion of the bridge bar and at their lower ends to the top portions of the lenses, said bars diverging downwardly and inwardly from the bowed portion of the bridge bar one to each of the lenses, said bridge and brace bars being formed of a material adapted to bend under pressure applied to the lenses whereby the lenses may be adjusted bodily toward and from each other and into planes at different angles with respect to each other and retained in the positions to which they are adjusted.

In testimony whereof, I hereunto affix my signature.

LOUISE C. KING.